Oct. 9, 1923.
H. G. MILLER ET AL
1,470,198
AUTO HITCHING POST
Filed Feb. 9, 1922
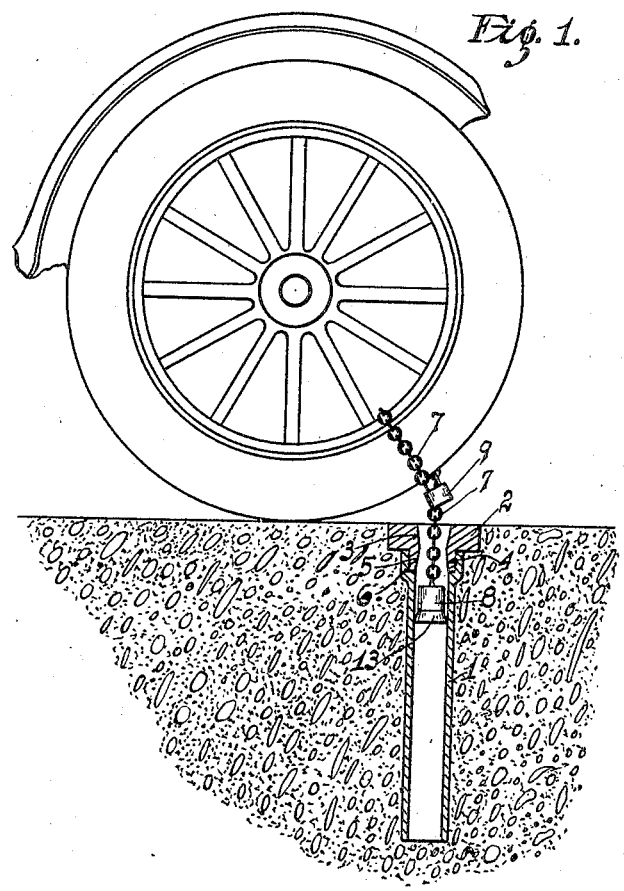
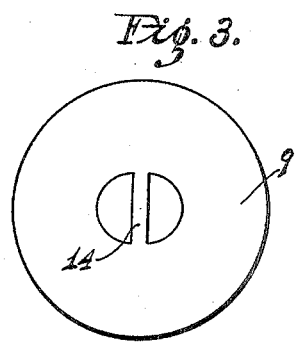
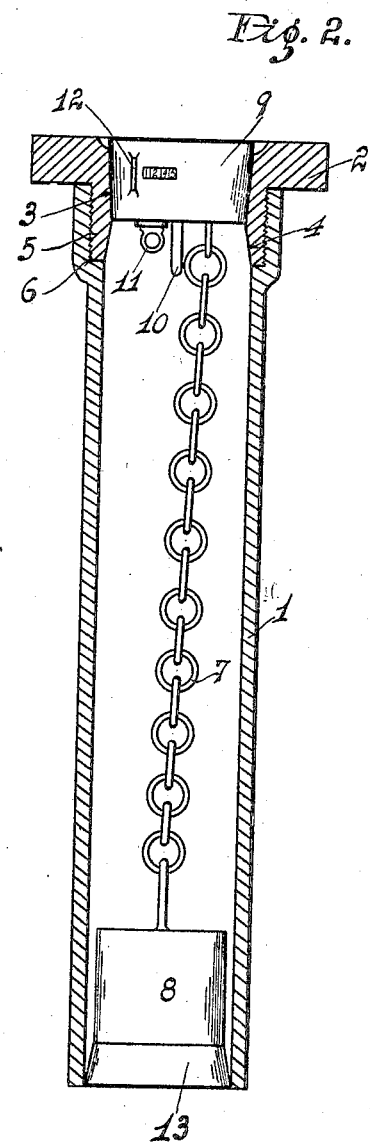
Inventor
Henry G. Miller.
Max M. Selzer.
By Harry C. Schroeder
Attorney Patented Oct. 9, 1923.

1,470,198

UNITED STATES PATENT OFFICE.

HENRY G. MILLER, OF SHAFTER, AND MAX M. SELZER, OF OAKLAND, CALIFORNIA.

AUTO HITCHING POST.

Application filed February 9, 1922. Serial No. 535,427.

*To all whom it may concern:*

Be it known that we, HENRY G. MILLER and MAX M. SELZER, citizens of the United States, residing at Shafter and Oakland, respectively, in the counties of Kern and Alameda, respectively, and State of California, have invented certain new and useful Improvements in Auto Hitching Posts, of which the following is a specification.

Our invention is an automobile lock for locking an automobile to a parking station.

Referring to the annexed drawing in which our invention is illustrated and which forms a part of this specification:

Figure 1 is a vertical section of our lock in position locking an automobile to a parking station.

Figure 2 is a vertical section of our lock in its position when not locking an automobile.

Figure 3 is a plan view of the lock.

In the drawing 1 indicates a tube on the upper end of which is formed an external flange 2, which tube is embedded vertically in the ground with the flange 2 countersunk in the surface of the ground. The inner surface 3 of the upper end of the tube 1 is conical, converging downwardly and the inner surface 4 of the tube is conical diverging downwardly from the surface 3. The surface 3 may be on the inside of a ring 5 detachably fitted in an annular groove 6 in the inside of the tube 1 as shown in Figure 1. To the lower end of a chain 7 is connected a weight 8 and to the upper end of said chain is connected a lock 9 which is frusto-conical to fit in the upper end of the tube 1 on the conical seat 3 with its upper surface flush with the upper surface of the flange 2 and the surface of the ground, in which position of the lock the chain 7 extends downwardly in the tube and the weight 8 rests in the lower end of the tube and holds the lock in said position. The lock 9 has a hasp 10 and is locked and unlocked by a key 11. The lock has a coin slot 12 into which a coin such as a dime must be deposited before the key 11 may be turned to lock the lock and remove key. On the upper surface of the lock 9 is a handle 14 by means of which the lock and the chain 7 may be drawn upwardly out of the tube and the weight 8 lifted in the tube. The weight 8 has a downwardly diverging conical surface 13 which engages the conical surface 4 to limit the outward withdrawal of the lock 9 and chain 7 from the upper end of the tube 1.

The automobile is locked to the parking station by extending the upward and outer portion of the chain 7 around the tire and felloe of a wheel of an automobile and locking the hasp 10 in one of the links of the chain as shown in Figure 1. The key 11 is taken out of the lock by the owner of the automobile and kept by him while he leaves the automobile locked.

Having described our invention we claim:

1. An automobile lock including a tube embedded in the ground, a weight in said tube, a chain in said tube connected at its lower end to said weight, a lock connected to the upper end of said chain, means for arresting said lock in the upper end of said tube, a hasp on said lock for engaging a link of said chain when the chain is extended around the tire and felloe of an automobile wheel, and means for limiting the outward withdrawal of said lock and chain.

2. An automobile lock including a tube embedded in the ground, a weight in said tube, a chain in said tube connected at its lower end to said weight a conical-shaped lock connected to the upper end of said chain, a conical seat in the upper end of said tube upon which said lock is held by said weight when not in use, a hasp on said lock for engaging one of the links of said chain, and means for limiting the outward withdrawal of said lock and chain.

3. An automobile lock including a tube embedded in the ground, a weight in said tube, a chain in said tube connected at its lower end to said weight, a lock connected to the upper end of said chain, means for arresting said lock in the upper end of said tube, a hasp on said lock for engaging a link of said chain when the chain is extended around the tire and felloe of an automobile wheel, a conical surface near the upper end of said tube, and a conical member on said weight for limiting the outward withdrawal of said lock and chain.

In testimony whereof we affix our signatures.

MAX M. SELZER.
HENRY G. MILLER.